(12) United States Patent
Lundström

(10) Patent No.: US 8,693,752 B2
(45) Date of Patent: Apr. 8, 2014

(54) SENSITIVITY LENS FOR ASSESSING UNCERTAINTY IN IMAGE VISUALIZATIONS OF DATA SETS, RELATED METHODS AND COMPUTER PRODUCTS

(75) Inventor: Claes Lundström, Linköping (SE)

(73) Assignee: Sectra AB, Linkoping (SE)

( * ) Notice: Subject to any disclaimer, the term of this patent is extended or adjusted under 35 U.S.C. 154(b) by 17 days.

(21) Appl. No.: 13/354,786

(22) Filed: Jan. 20, 2012

(65) Prior Publication Data

US 2012/0151405 A1  Jun. 14, 2012

Related U.S. Application Data

(62) Division of application No. 11/881,022, filed on Jul. 25, 2007, now Pat. No. 8,131,033.

(51) Int. Cl.
*G06K 9/00* (2006.01)
*G06T 17/00* (2006.01)

(52) U.S. Cl.
USPC ........................ 382/128; 382/131; 345/424

(58) Field of Classification Search
USPC ......... 382/100, 128–132; 128/920; 600/1–15; 601/1–2; 606/1; 700/28; 715/762, 823, 715/840, 856, 861–863; 345/157–424
See application file for complete search history.

(56) References Cited

U.S. PATENT DOCUMENTS

| | | | | |
|---|---|---|---|---|
| 5,553,618 A * | 9/1996 | Suzuki et al. | ................. | 600/411 |
| 5,687,331 A * | 11/1997 | Volk et al. | ..................... | 715/840 |
| 6,687,329 B1 * | 2/2004 | Hsieh et al. | ..................... | 378/62 |
| 7,702,409 B2 * | 4/2010 | Lucas et al. | ..................... | 700/96 |
| 7,870,511 B2 | 1/2011 | Suzuki | | |
| 2004/0135824 A1 * | 7/2004 | Fitzmaurice | .................. | 345/856 |
| 2005/0152588 A1 * | 7/2005 | Yoshida et al. | ............... | 382/128 |
| 2007/0008318 A1 | 1/2007 | Matsumoto | | |
| 2007/0232943 A1 * | 10/2007 | Harel et al. | .................... | 600/508 |
| 2008/0292164 A1 * | 11/2008 | Azar et al. | ..................... | 382/131 |
| 2009/0022386 A1 * | 1/2009 | Karau et al. | .................... | 382/131 |
| 2009/0103793 A1 * | 4/2009 | Borland et al. | ............... | 382/131 |
| 2009/0304246 A1 * | 12/2009 | Walker et al. | ................. | 382/128 |

OTHER PUBLICATIONS

Djurcilov et al., Volume Rendering Data with Uncertainty Information, *UCSC Computer Science Department, Division of Engineering and Applied Sciences*, Harvard University 12 pages (believed prior to Jul. 25, 2007).

Drebin et al., Volume rendering, *In Proceedings of Computer Graphics and Interactive Techniques*, vol. 22, pp. 65-74, ACM SIGGRAPH, 1988.

Ehlschlaeger et al., Visualizing Spatial Data Uncertainty Using Animation, *Computers & Geosciences*, vol. 23, No. 4, pp. 387-395, 1997.

Engel et al., Transfer Functions, *Real-time Volume Graphics*, pp. 81-83, © 2006.

(Continued)

*Primary Examiner* — Hadi Akhavannik
*Assistant Examiner* — Mehdi Rashidian
(74) *Attorney, Agent, or Firm* — Myers Bigel Sibley & Sajovec, P.A.

(57) ABSTRACT

Systems for rendering images from a multi-dimensional data set include a sensitivity lens configured to electronically render a sequence of images showing features in a region of interest to interrogate and/or explore potential uncertainties in the rendered visualizations of images.

23 Claims, 14 Drawing Sheets

(9 of 14 Drawing Sheet(s) Filed in Color)

(56) References Cited

OTHER PUBLICATIONS

Gershon, N.D., Visualization of Fuzzy Data Using Generalized Animation, 1992 *IEEE*, pp. 268-273, 1992.

Grigoryan et al., Point-Based Probabilistic Surfaces to Show Surface Uncertainty, *IEEE Transactions on Visualization and Computer Graphics* vol. 10(5), pp. 564-573, 2004.

Hengl et al., Visualisation of uncertainty using the HIS colour model computations with colours,*Proceedings of the 7th International Conference on GeoComputation*, pp. 8-17, 2003.

Kniss et al., Statistically Quantitative Volume Visualization, *IEEE Visualization*, pp. 287-294, 2005.

Kniss et al., Multidimensional Transfer Functions for Volume Rendering, *The Visualization Handbook*, Chapter 9, pp. 189-209, © 2005.

Lundström et al., Local Histograms for Design of Transfer Functions in Direct Volume Rendering, *IEEE Transactions on Visualization and Computer Graphics*, vol. 12(6), pp. 1570-1579, 2006.

Lundstrom, C., Uncertainty visualization in medical volume rendering using probabilistic animation, 8 pages, to be posted online Nov. 2, 2007.

Pang et al., Approaches to uncertainty visualization, *The Visual Computer*, vol. 13, pp. 370-390, 1997.

Persson et al., Volume rendering compared with maximum intensity projection for magnetic resonance angiography measurements of the abdominal aorta, *Acta Radiologica*, vol. 45, pp. 453-459, 2004.

Rheingans et al., Visualization of Molecules with Positional Uncertainty, *University of Maryland*, Baltimore, 8 pages, 1999.

Rhodes et al., Uncertainty Visualization Methods in Isosurface Rendering, *Eurographics*, 6 pages, 2003.

\* cited by examiner 100  100  100

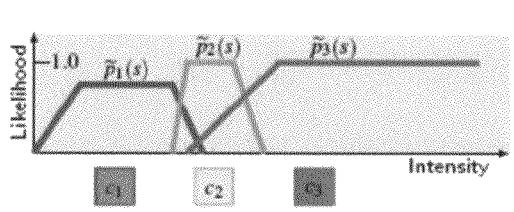
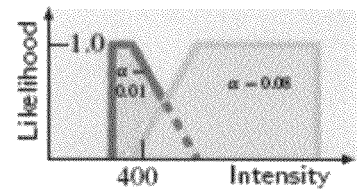
FIG. 10A  FIG. 10B
FIG. 11A  FIG. 11B
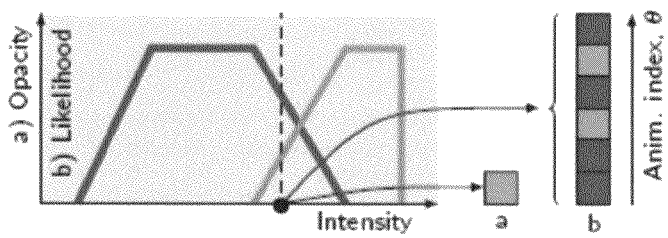
FIG. 12
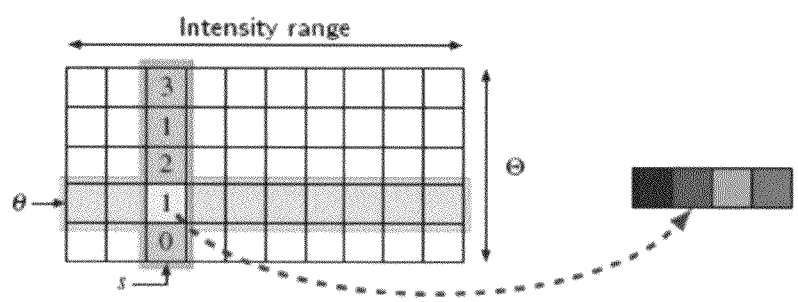
FIG. 13

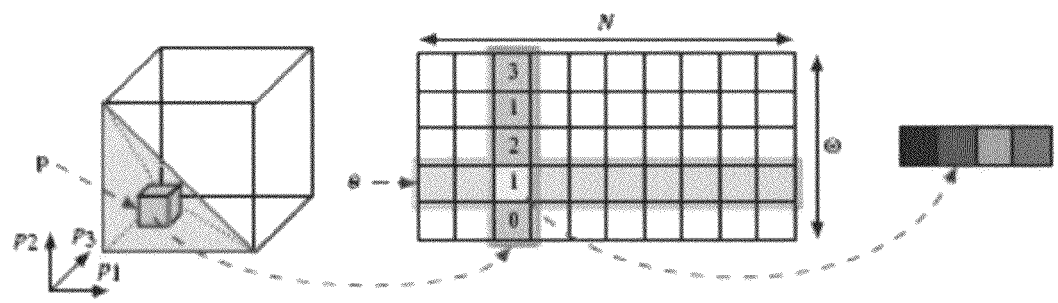
FIG. 16
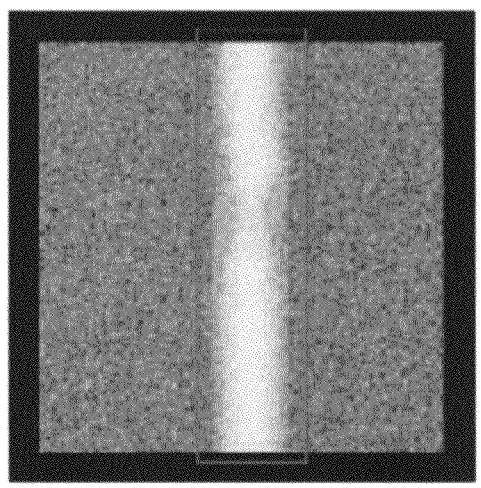 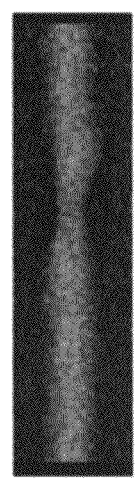 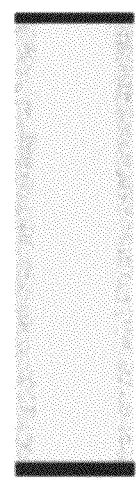 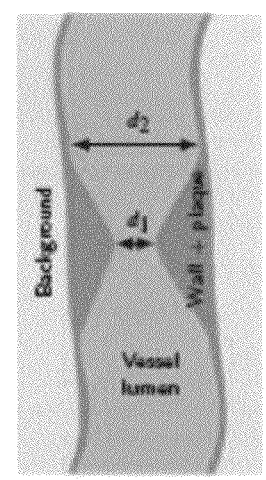
FIG. 17A     FIG. 17B   FIG. 17C     FIG. 17D

SENSITIVITY LENS FOR ASSESSING UNCERTAINTY IN IMAGE VISUALIZATIONS OF DATA SETS, RELATED METHODS AND COMPUTER PRODUCTS

RELATED APPLICATION

This application is a divisional of U.S. patent application Ser. No. 11/881,022, filed Jul. 25, 2007 now U.S. Pat. No. 8,131,033, the contents of which are hereby incorporated by reference as if recited in full herein.

FIELD OF THE INVENTION

The present invention relates to medical visualizations of image data and may be particularly suitable for viewing important diagnostic features in medical images.

RESERVATION OF COPYRIGHT

A portion of the disclosure of this patent document contains material to which a claim of copyright protection is made. The copyright owner has no objection to the facsimile or reproduction by anyone of the patent document or the patent disclosure, as it appears in the patent and trademark office patent file or records, but reserves all other rights whatsoever.

BACKGROUND OF THE INVENTION

Uncertainty in visualization is an important area within medical imaging where adequate technical solutions have not been proposed. Before digital images, in the era of film-based radiology, physicians were restricted to the single visualization represented by the film. However, there now are a large number of ways to present a medical image, i.e., ways to visualize the digital data. Having the images in digital format means that the user can adjust many parameters in order to visualize different aspects of the data. This means that there can be other relevant alternative visualizations that a radiologist or other clinician should consider before making a diagnosis based on a single visualization. In other words, these alternatives can constitute an uncertainty in the visualization that should be explored, as when uncertainty is not considered, the diagnostic assessment may be incorrect.

SUMMARY OF EMBODIMENTS OF THE INVENTION

Embodiments of the present invention are directed to methods, systems and computer program products providing a sensitivity lens that can explore and/or expose, uncertainty in visualizations, which can be particularly useful in diagnostic medical visualizations.

Embodiments of the invention are particularly suitable for pacs (picture archiving and communication system), however, embodiments of the invention are more generally applicable, and should not be interpreted to be limited to pacs.

Some embodiments are directed to visualization systems for rendering images from a multi-dimensional data set. The systems include a visualization system with a display and a graphic user input configured to apply a sensitivity lens to a region of interest in an image rendered from a multi-dimensional image data set. The sensitivity lens causes the visualization system to automatically electronically render different visualizations of the region of interest to interrogate uncertainty in the rendered image associated with the visualization of at least one feature in the region of interest.

The uncertainty interrogation may be used to illustrate a visual impact of at least one of the following: (a) different viewing parameters or (b) different processing parameters, to thereby allow a clinician to consider uncertainty in the rendered image associated with the visualization of at least one feature in the region of interest. The different visualizations can be displayed as an animated sequence.

Other embodiments are directed to graphic user interface tools. The tools include at least one user-selectable sensitivity lens that cooperates with a display to allow a user to select a region of interest in a rendered diagnostic medical image to automatically electronically generate different visualization versions of the region of interest associated with uncertainty in visualization of the rendered image.

Still other embodiments are directed to methods of assessing uncertainty in rendering images of features in medical visualization systems. The methods include: (a) accepting user input to apply at least one sensitivity lens to a region of interest in a visualization of a rendered image; and (b) automatically displaying different visualizations of the region of interest defined by the sensitivity lens to assess uncertainty in the visualization of the rendered image.

Additional embodiments are directed to signal processor circuits that include a rendering module for rendering images from respective patient multidimensional imaging data sets obtained from one or several different imaging modalities. The circuit is configured to communicate with a graphical user interface associated with a client workstation to accept user input to apply at least one sensitivity lens to a region of interest in a visualized medical image rendered from a multidimensional image data set whereby a sequence of different visualizations of the region of interest in the sensitivity lens is displayed in quick succession, typically between about 1-50 frames per second.

Some embodiments are directed to computer program products for providing a visualization uncertainty assessment tool for visualizations of rendered diagnostic medical images. The computer program products include a computer readable storage medium having computer readable program code embodied in the medium. The computer-readable program code including computer readable program code configured to generate a sequence of different visualizations of a region of interest in an image rendered from a multi-dimensional image data set. The sequence of different visualizations generated can visually explore uncertainty in the visualization of features in the region of interest.

The sequence of different visualizations can be used to illustrate a visual impact of different viewing and/or processing parameters.

Still other embodiments are directed to visualization systems for rendering diagnostic medical images from a multi-dimensional data set. The systems include a visualization system configured to apply a transfer function with an explicit probabilistic model to classify image data based on a likelihood of material type and map an intensity value to an array of pure material colors to render a medical image from a multi-dimensional image data set.

The visualization systems may be configured to generate an animation of frames of different visualizations of a region of interest and run the frames in at least one of material sync animation, random mode animation and grouped random mode animation.

Yet other embodiments are directed to visualization systems for rendering diagnostic medical images from a multi-dimensional data set. The systems include a visualization system configured to substantially automatically electronically generate and display an animation of different visualizations showing potential visualization uncertainty in at least part of a diagnostic medical image.

It is noted that any of the features claimed with respect to one type of claim, such as a system, apparatus, circuit or computer program, may be claimed or carried out as any of the other types of claimed operations or features.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 4A-C shows uncertainty in the region of the image using a material sync mode.

FIG. 9A is a graph of opacity versus intensity of a conventional model where each material corresponds to a varying opacity across the data value range (intensity). FIG. 9B is a graph of likelihood (probability) versus intensity of a probabilistic model, where each material corresponds to a varying material likelihood across the data value range (intensity) and both a static color and a static opacity according to embodiments of the present invention.

FIG. 10A is a graph of likelihood of material (color) versus intensity associated with an explicitly probabilistic transfer function model according to embodiments of the present invention.

FIG. 10B is a graph of likelihood of material (color) versus intensity associated with an explicitly probabilistic transfer function model used to generate the animation frames images in FIGS. 4A-C according to embodiments of the present invention.

FIGS. 11A and 11B are screen shots of MR (Magnetic Resonance) renal images with FIG. 11A corresponding to a traditional rendering and FIG. 11B desaturated using a probabilistic model according to embodiments of the present invention.

FIG. 12 is a schematic of a traditional DVR (direct volume rendering) TF mapping versus a probabilistic animation model according to embodiments of the invention.

FIG. 13 is a schematic illustration of a fragment shader implementation of probabilistic uncertainty animation according to embodiments of the present invention.

FIG. 14a is a traditional rendering. FIG. 14b is a traditional TF (opacity versus intensity) used for the rendering in FIG. 14a. FIG. 14c is an explicitly probabilistic transfer function used for animation. FIGS. 14d-14f are frames of probabilistic animation in random mode. FIG. 14g is a schematic illustration of intensity to color mapping in random mode. FIGS. 14h-14j are frames from probabilistic animation in material sync mode. FIG. 14k is a schematic illustration of intensity to color mapping in material sync mode.

FIG. 16 is a schematic illustration of a general case of probabilistic animation according to embodiments of the present invention.

FIGS. 17A-17D illustrate a simulated stenosis study. FIG. 17A is an example of a rendered image frame in material sync mode of a vessel model. FIGS. 17B and 17C are cut-outs (red frame of full image) of the vessel at two other time steps. FIG. 17D is a schematic of the vessel model.

FIG. 19A is a conventional rendering. FIGS. 19B-19D are frames of uncertainty animation in material sync mode according to embodiments of the present invention. FIG. 19E is a traditional TF used to generate the image in FIG. 19A. FIG. 19F is a probabilistic transfer function (likelihood versus intensity) used to generate the animation frames shown in FIGS. 19C-19D.

FIG. 20A illustrates a tissue complex in the right brain hemisphere having a cyst (a), a hemorrhage (b), and a ventricle (c), all three in the yellow-orange span in an actual color image. The complex is surrounded by an edema (green) (in an actual color image). The diagnostic task is to determine the borders between the cyst and the hemorrhage. FIG. 20A is a traditional rendering. FIG. 20B is a probabilistic TF. FIGS. 20C and 20D are two different zoom-ins of uncertainty animation frames in random mode.

DETAILED DESCRIPTION OF EMBODIMENTS OF THE INVENTION

Figure 1:
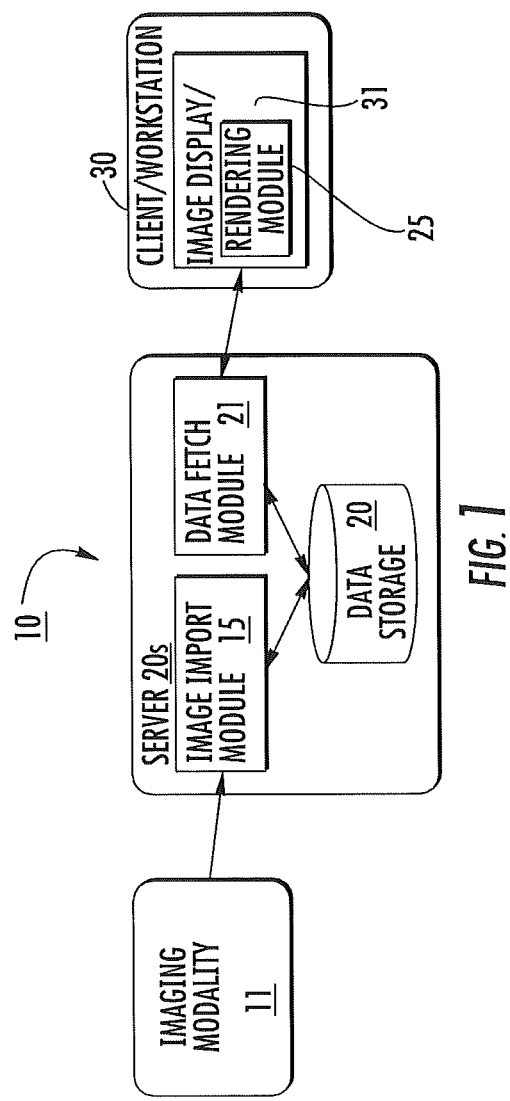
FIG. 1 is a schematic diagram of an electronic visualization system that can be used to render and display images

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The term "Direct Volume Rendering" or DVR is well known to those of skill in the art. DVR comprises electronically rendering a medical image directly from data sets to thereby display visualizations of target regions of the body, which can include color as well as internal structures, using multi-dimensional 3D or 4D or more dimensional data. In contrast to conventional iso-surface graphic constructs, DVR does not require the use of intermediate graphic constructs (such as polygons or triangles) to represent objects, surfaces and/or boundaries. However, DVR can use mathematical models to classify certain structures and can use graphic constructs. The term "Transfer Function" or "TF" is well known to those of skill in the art. A TF acts as a classification tool and maps sample values in a data set to visual appearance parameters, such as color and opacity.

Also, although embodiments of the present invention are directed to DVR of medical images, other image generation techniques and other multi-dimensional 3-D or 4-D image data may also be used. That is, the 3-D images with respective visual characteristics or features may be generated differently when using non-DVR techniques.

Two-dimensional (2-d), three-dimensional (3-d) and four-dimensional (4-d) visualization products for providing medical images can employ rendering techniques to create images from stored electronic data files. The data input used to create the image renderings can be a stack of image slices from a desired imaging modality, for example, a computed tomography (ct) or magnetic resonance (mr) modality and/or from combinations thereof. The visualization can convert the image data into an image volume to create renderings that can be displayed on a workstation display. Image visualizations using the multi-dimensional image data can be carried out using any suitable system such as, for example, pacs. Pacs is a system that receives images from the imaging modalities, stores the data in archives, and distributes the data to radiologists and clinicians for viewing.

The term "automatically" means that the operation can be substantially, and typically entirely, carried out without human or manual input, and is typically programmatically directed or carried out. The term "electronically" includes both wireless and wired connections between components. The term "image quality" in a medical image context refers to diagnostically relevant content in the rendered image. Full or high quality means that important anatomical and/or functional features are shown at as high precision as the resolution of the original data set permits. Low quality means that features are shown with less precision or focus. The term "sensitivity lens" describes a graphic user interface (GUI), typically a frame or window, that is in communication with an image rendering and/or display circuit that can allow a clinician to select and electronically explore uncertainties in a region of interest in the visualization(s) of the image on a display. The terms "image uncertainty" or "visualization uncertainty" and the like refer to possible differences in appearance of the medical image due to alternative ways of visualizing and/or processing the image data.

The term "clinician" means physician, radiologist, physicist, or other medical personnel desiring to review medical data of a patient. The term "tissue" means blood, cells, bone and the like. "Distinct or different tissue" or "distinct or different material" means tissue or material with dissimilar density or other structural or physically characteristic. For example, in medical images, different or distinct tissue or material can refer to tissue having biophysical characteristics different from other (local) tissue. Thus, a blood vessel and spongy bone may have overlapping intensity but are distinct tissue. In another example, a contrast agent can make tissue have a different density or appearance from blood or other tissue.

Visualization means to present medical images to a user/clinician for viewing. The visualization can be in a flat 2-D and/or in 2-D what appears to be 3-D images on a display, data representing features with different visual characteristics such as with differing intensity, opacity, color, texture and the like. The images as presented by the visualization do not have to be the same as the original construct (i.e., they do not have to be the same 2-D slices from the imaging modality). Two common visualization techniques (apart from viewing original slices) are Multiplanar Reconstruction (MPR), which shows an arbitrary oblique slice through the anatomy and Maximum Intensity Projection (MIP) where a slab is visualized by displaying the maximum value "seen" from each image pixel. For MPR, there are a number of variants, the slice can be thin or constructed by averaging a thicker slab, etc.

The term "animation" refers to a sequence or series of images shown in succession, typically in relatively quick succession, such as in about 1-50 frames per second. The term "frame" refers to a single visualization or static image. The term "animation frame" refers to one image frame of the different images in the sequence of images. The term "probabilistic animation" refers to an animation technique where the animation frames are created based on a classification of features in a data set, where the classification is based on statistic probability. The term "probabilistic transfer" function refers to a transfer function where the inherent classification is defined explicitly in terms of probabilities. The term "parameter perturbation" refers to a controlled electronic alteration and/or variation of a processing and/or rendering parameter typically resulting in a different visualization of a common region of interest in an image.

The term "similar examination type" refers to corresponding anatomical regions or features in images having diagnostic or clinical interest in different data sets corresponding to different patients (or the same patient at a different time). For example, but not limited to, a coronary artery, organs, such as the liver, heart, kidneys, lungs, brain, and the like.

In the medical image case, important diagnostic features usually corresponds to a particular tissue, such as bone, blood vessels, blood, brain tissue (white or gray matter), skin, cartilage, tendon, ligament, etc.

A data set can be defined as a number of grid points in G dimensions, where there is V number of values in each grid point. The term "multi-dimensional" refers to both components, grid G and variates V, of the data sets. For data sets having a V≥1, the data set is referred to as multi-variate. Examples: a normal medical data set has G=3 and V=1, a normal time-dependent volume has G=4 and V=1, a volume describing flow will have G=3 and V=3 (three values, since the velocity is a 3D vector). The data sets of the instant invention for medical images will typically have G and V values of: G≤4 and V≤6.

In the description that follows, a client-server setup is illustrated, but the data retrieval interfaces contemplated by the instant invention may be implemented within one computer as well. The term "client" will be used both to denote a computer and the software (application) running on the computer. Additional computers can be used including more than one server and/or more than one client for a workstation. For example, the server can be more than one server with different functions carried out by or between different servers, such as the patient data short or long-term storage can be on one or more separate servers.

Turning now to FIG. 1, an exemplary visualization system 10 is illustrated. As known to those of skill in the art, the system 10 can include at least one server 20s with an image import module 15, patient data storage 20, a data fetch module 21, a client (and/or workstation) 30 and a rendering system 25. The visualization system 10 can be in communication with at least one imaging modality 11 that electronically obtains respective volume data sets of patients and can electronically transfer the data sets to the electronic storage 20. The imaging modality 11 can be any desirable modality such as, but not limited to, nmr, mri, x-ray of any type, including, for example, ct (computed tomography) and fluoroscopy, ultrasound, and the like. The visualization system 10 may also operate to render images using data sets from more than one of these modalities. That is, the visualization system 10 may be configured to render images irrespective of the imaging modality data type (i.e., a common system may render images for both ct and mri volume image data). In some embodiments, the system 10 may optionally combine image data sets generated from different imaging modalities 11 to generate a combination image for a patient.

the rendering system 25 can be in communication with a physician workstation 30 to allow user input (typically graphical user input ("GUI")) and interactive collaboration of image rendering to give the physician alternate image views of the desired features in generally, typically substantially, real time. The rendering system 25 can be configured to zoom, rotate, and otherwise translate to give the physician visualization of the patient data in one or more views, such as section, front, back, top, bottom, and perspective views. The rendering system 25 may be wholly or partially incorporated into the physician workstation 30, or can be a remote or local module (or a combination remote and local module) component or circuit that can communicate with a plurality of physician workstations (not shown). The visualization system can employ a computer network and may be particularly suitable for clinical data exchange/transmission over an intranet. A respective workstation 30 can include at least one display 31 (and may employ two or more adjacent displays). The workstation 30 and/or rendering system 25 form part of an image processor system that includes a digital signal processor and other circuit components that allow for collaborative interactive user input using the display at the workstation 30. Thus, in operation, the image processor system renders the visualization of the medical image using the medical image volume data, typically on at least one display at the physician workstation 30.

Figure 2:
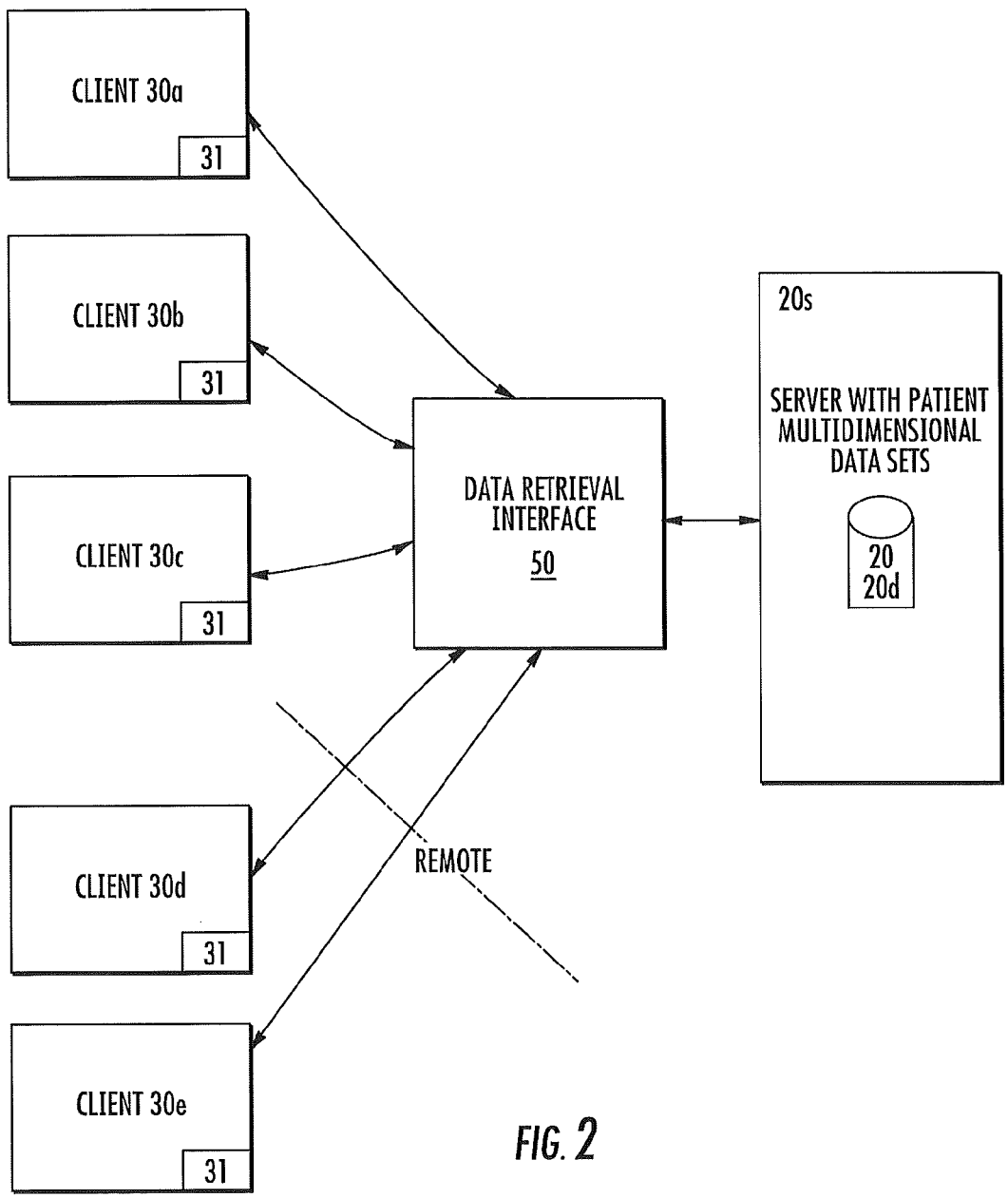
FIG. 2 is a schematic illustration of an imaging visualization system such as a PACS according to embodiments of the present invention.

As shown in FIG. 2, each respective workstation 30 can be described as a client 30 (shown as 30a, 30b, 30c, . . . 30e) that typically includes or communicates with at least one display 31 and communicates with at least one (hub or remote) server 20s that stores the patient data sets or is in communication with the stored patient electronic data files 20. Additional numbers of clients 30 may be in communication with the server 20s and more than one server 20s may be used to store patient data. A data retrieval interface 50 can be used to communicate with the clients 30a-30e and the stored data sets on and/or accessible via server 20s. Some of the clients, shown as clients 30a, 30b, 30c can be local (within a common clinic or facility) and can access the data sets via a relatively broadband high speed connection using, for example, a LAN, while others, shown as clients 30d, 30e, designated by the broken line, may be remote and/or may have lesser bandwidth and/or speed, and for example, may access the data sets via a WAN and/or the Internet. Firewalls may be provided as appropriate for security.

For ease of discussion, the data retrieval interface 50 is shown as a stand-alone module or circuit. However, the interface 50 can be disposed partially on each client 30, partially or wholly on the server 20s, or may be configured as a discrete data retrieval interface server 50s (not shown). The clients 30, server 20s and/or interface 50 can each include a digital signal processor, circuit and/or module that can carry out aspects of the present invention. All or selected ones of the clients 30a-30e (FIG. 2) can be online at the same time and may each repeatedly communicate with the data retrieval interface 50 to request volume image data.

Figure 5A:
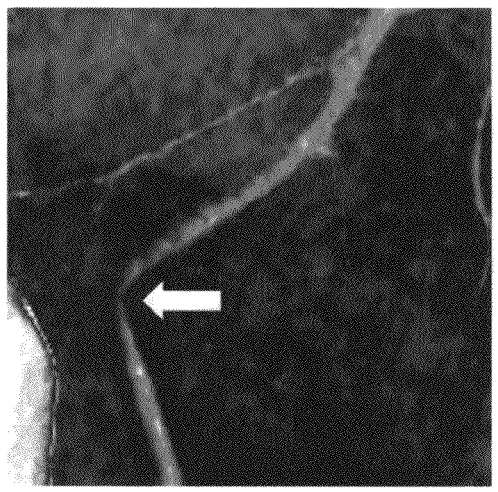
FIG. 5A is a screen shot of CT angiography visualized using DVR and a pre-defined Transfer Function (TF) to assess a possible stenosis in the vessel pointed out by the arrow.
Figure 5B:
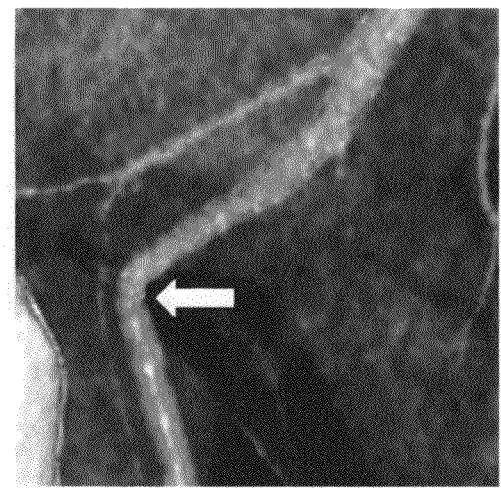
FIG. 5B is a screen shot of the same feature rendered using alternate Transfer Function settings from that used in FIG. 5A and shows that there is no stenosis.

Conventionally, radiologists or other clinicians have manually explored visualization parameters, such as, for example, greyscale windowing, corresponding to contrast and brightness levels of the image. Different settings can give dramatically different appearance that, in turn, can lead to different diagnostic assessments. Radiologists typically apply manual adjustments to explore the possible alternatives. In the case of 3D visualizations achieved with Direct Volume Rendering (DVR), the corresponding component is the Transfer Function (TF), whose alternative parameter settings also constitute an uncertainty that would benefit from exploration. One example is shown in FIGS. 5A and 5B. FIG. 5A is a rendering using a predefined Transfer Function. This visualization indicates a probable stenosis as noted by the arrow. However, using other Transfer Function settings, as shown in FIG. 5B, the visualization shows that there is no stenosis. Thus, when uncertainty is not considered in the rendered visualization, diagnostic assessment can be incorrect, potentially causing an unnecessary surgical procedure.

Figure 3:
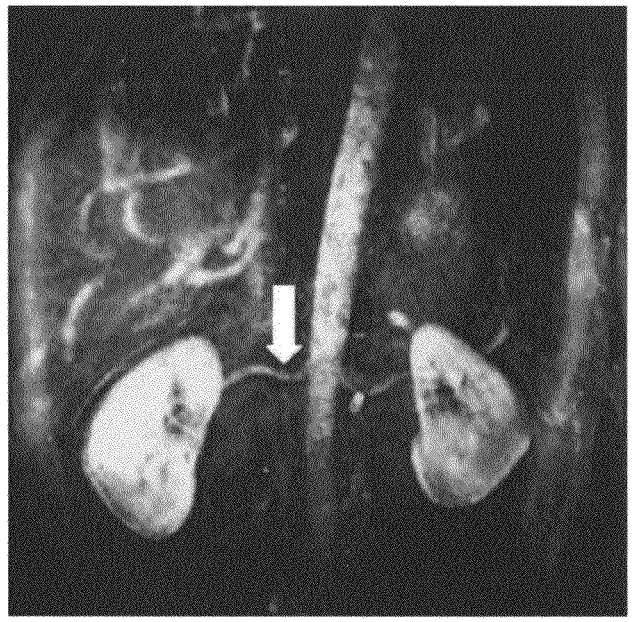
FIG. 3 is a screen shot of a conventional rendering of an MR renal angiography, superimposed with an arrow that points to a suspected abnormality.
Figures 4A, 4B, 4C:
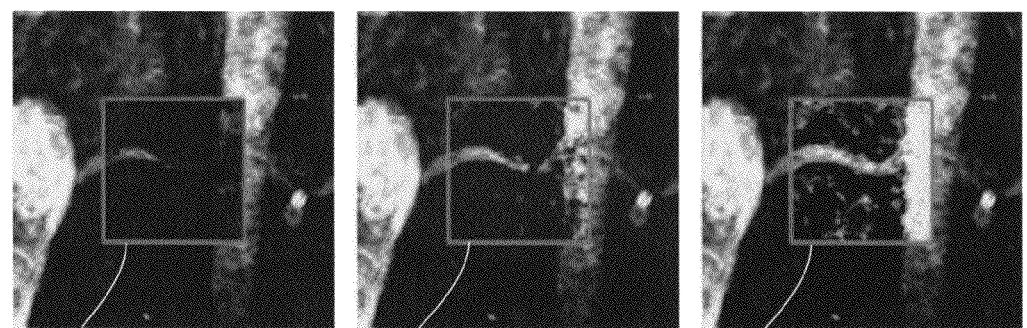
FIGS. 4A-4C are screen shots of the image shown in FIG. 3, modified with a sensitivity lens applied to the suspected abnormality region according to embodiments of the invention. The sensitivity lens reveals that there is no stenosis, contrary to what could be suspected based on the visualization image in FIG. 3.

FIG. 3 illustrates a conventional rendering of an MR renal angiography. A potential abnormality (stenosis) appears in the image as noted by the arrow. As shown in FIGS. 4A-4C, a sensitivity lens 100 placed over the suspected abnormality can electronically and substantially automatically generate at least one alternate visualization (typically a plurality in an animated sequence) of a subset of the displayed image. The alternate visualization(s) can allow a clinician to evaluate uncertainty in visualizations of a common feature in the different diagnostic visualization images using the same patient image data. The sensitivity lens 100 can be manually or automatically placed over a portion of an image to programmatically generate and sequentially display alternate visualizations of the underlying portion of the image based on known potential sources of uncertainty in an (medical) imaging pipeline to provide alternate visualizations of a patient's image data (e.g., regions or features of interest). The sensitivity lens 100 can generate visualizations based on a probabilistic animation of different visualizations based on different uncertainty sources. The remaining portion(s) of the image (outside the sensitivity lens) can be unchanged from the original visualization. The window or frame of the sensitivity lens can "zoom" or enlarge an anatomical feature(s) of interest in the window or frame for ease of viewing the alternate visualizations for clarity in uncertainty review.

As will be appreciated by one of skill in the art, embodiments of the invention may be embodied as a method, system, data processing system, or computer program product. Accordingly, the present invention may take the form of an entirely software embodiment or an embodiment combining software and hardware aspects, all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic or other electronic storage devices.

Computer program code for carrying out operations of the present invention may be written in an object oriented programming language such as Java, Smalltalk or C++. However, the computer program code for carrying out operations of the present invention may also be written in conventional procedural programming languages, such as the "C" programming language or in a visually oriented programming environment, such as VisualBasic.

Certain of the program code may execute entirely on one or more of the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider). In some embodiments, some program code may execute on local computers and some program code may execute on one or more local and/or remote server. The communication can be done in real time or near real time or off-line using a volume data set provided from the imaging modality.

The invention is described in part with reference to flowchart illustrations and/or block diagrams of methods, systems, computer program products and data and/or system architecture structures according to embodiments of the invention. It will be understood that each block of the illustrations, and/or combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory or storage that can direct a computer or other programmable data processing apparatus to function in a particular manner, such that the instructions stored in the computer-readable memory or storage produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 6A:
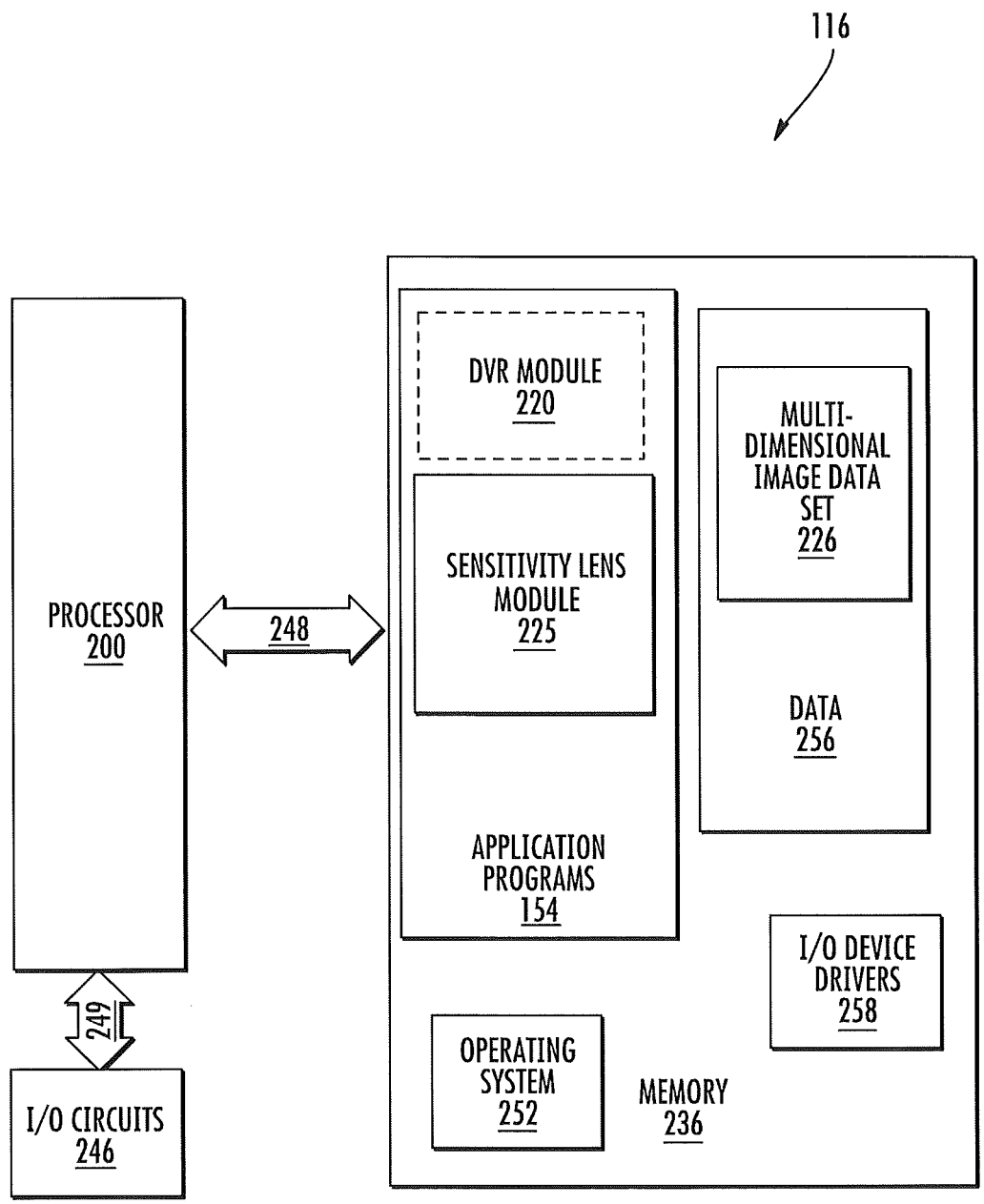
FIG. 6A is a block diagram of a data processing system with a sensitivity lens module according to embodiments of the present invention.

As illustrated in FIG. 6A, embodiments of the invention may be configured as a data processing system 216, which can be used to carry out or direct operations of the rendering, and can include a processor circuit 200, a memory 236 and input/output circuits 246. The data processing system may be incorporated in, for example, one or more of a personal computer, workstation 30, server, router or the like. The system 116 can reside on one machine or between a plurality of machines. The processor 200 communicates with the memory 236 via an address/data bus 248 and communicates with the input/output circuits 246 via an address/data bus 249. The input/output circuits 246 can be used to transfer information between the memory (memory and/or storage media) 236 and another computer system or a network using, for example, an Internet protocol (IP) connection. These components may be conventional components such as those used in many conventional data processing systems, which may be configured to operate as described herein.

In particular, the processor 200 can be commercially available or custom microprocessor, microcontroller, digital signal processor or the like. The memory 236 may include any memory devices and/or storage media containing the software and data used to implement the functionality circuits or modules used in accordance with embodiments of the present invention. The memory 236 can include, but is not limited to, the following types of devices: ROM, PROM, EPROM, EEPROM, flash memory, SRAM, DRAM and magnetic disk. In some embodiments of the present invention, the memory 236 may be a content addressable memory (CAM).

As further illustrated in FIG. 6A, the memory (and/or storage media) 236 may include several categories of software and data used in the data processing system: an operating system 252; application programs 154; input/output device drivers 258; and data 256. As will be appreciated by those of skill in the art, the operating system 252 may be any operating system suitable for use with a data processing system, such as IBM®, OS/2®, AIX® or zOS® operating systems or Microsoft® Windows®95, Windows98, Windows2000, Windows Vista, or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 258 typically include software routines accessed through the operating system 252 by the application programs 154 to communicate with devices such as the input/output circuits 246 and certain memory 236 components. The application programs 154 are illustrative of the programs that implement the various features of the circuits and modules according to some embodiments of the present invention. Finally, the data 256 represents the static and dynamic data used by the application programs 154 the operating system 252 the input/output device drivers 258 and other software programs that may reside in the memory 236.

The data 256 may include (archived or stored) multi-dimensional patient digital image data sets 226 that provides stacks of image data correlated to respective patients. As further illustrated in FIG. 6A, according to some embodiments of the present invention application programs 154 include a Sensitivity Lens Module 225. The application programs may also optionally include a DVR Module (220) and a data interface module can be decoupled or isolated from the DVR module. The application program 154 may be located in a local server (or processor) and/or database or a remote server (or processor) and/or database, or combinations of local and remote databases and/or servers.

While the present invention is illustrated with reference to the application programs 154 in FIG. 6A, as will be appreciated by those of skill in the art, other configurations fall within the scope of the present invention. For example, rather than being application programs 154 these circuits and modules may also be incorporated into the operating system 252 or other such logical division of the data processing system. Furthermore, while the application program 154 is illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 6A but may be provided by other arrangements and/or divisions of functions between data processing systems. For example, although FIG. 6A is illustrated as having various circuits and modules, one or more of these circuits or modules may be combined or separated without departing from the scope of the present invention.

Figure 6B:
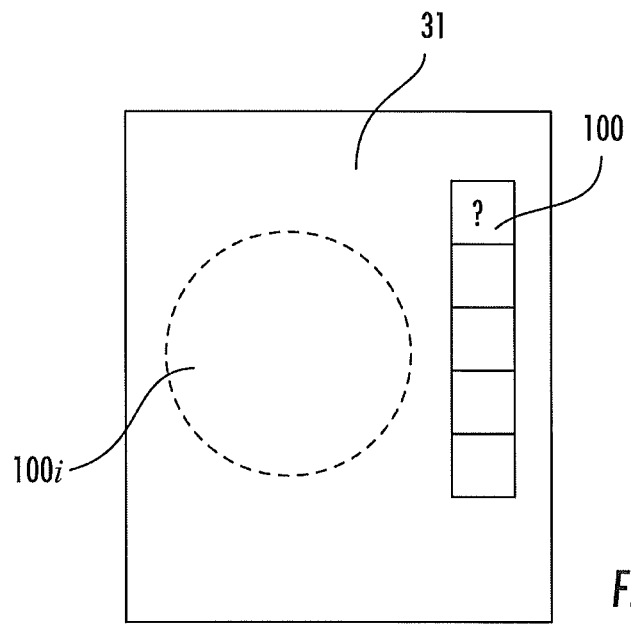
FIGS. 6B and 6C are schematic illustrations of a sensitivity lens tool according to embodiments of the present invention.
Figure 6C:
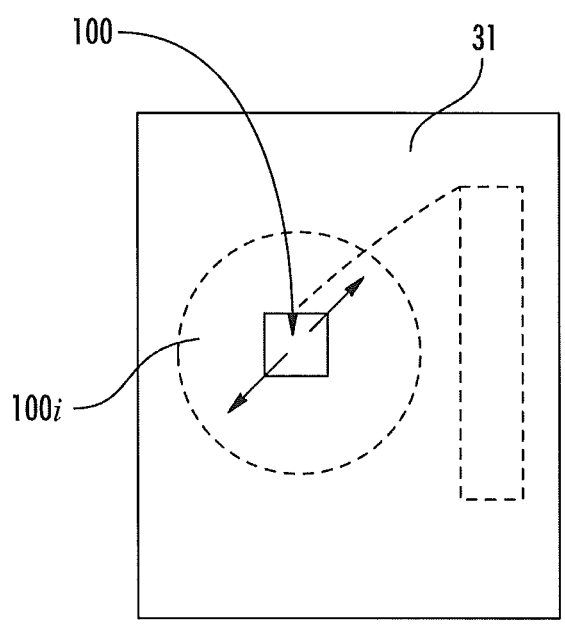

FIGS. 6B and 6C illustrate that the sensitivity lens 100 can be associated with an icon (shown as a question mark) that can be a "click and drag" tool on a tool menu or tool bar that a user can drag to overlie a region of interest in a displayed image 100i. The sensitivity lens tool 100 can be selectable from a drop down menu, and/or may be activated via a voice prompt or other user input tool such as upon a left or right click of a mouse. The sensitivity lens tool 100 may be arranged to have pre-defined alternate visualization and processing parameters to generate the sequence of images based on a similar examination type. The sensitivity lens 100 may be automatically applied based on the examination type without requiring a user to apply the lens to an important diagnostic feature. The sensitivity lens 100 can be configured to have a user adjustable size and/or shape to fit the region of interest with important diagnostic features.

Figure 7:
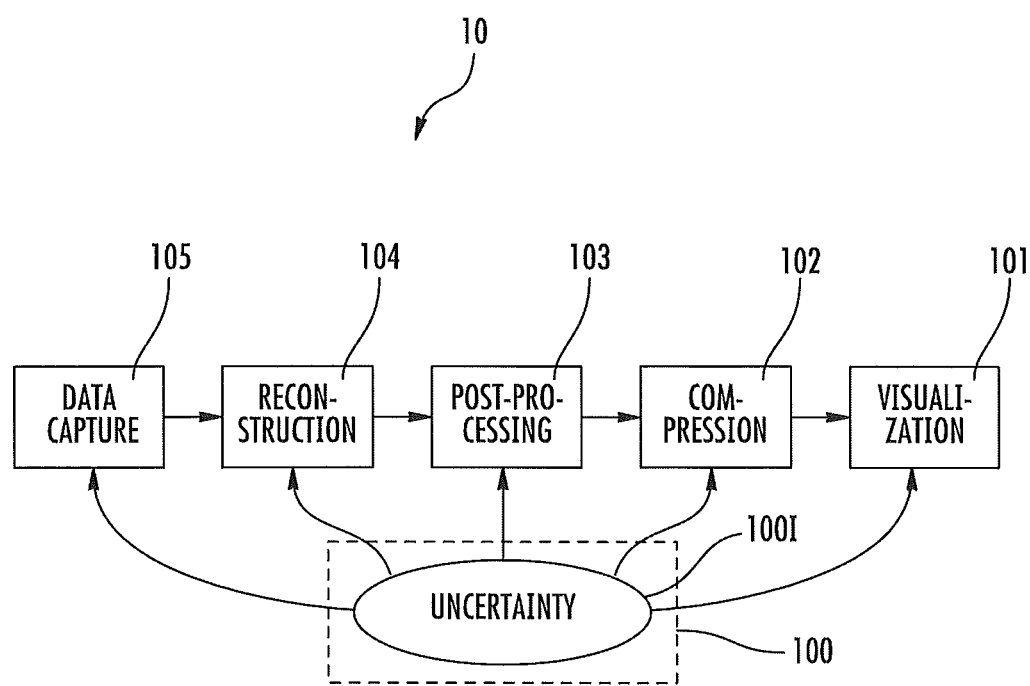
FIG. 7 is a schematic illustration of examples of different sources of uncertainty in visualization systems according to embodiments of the present invention.

As shown in FIG. 7, uncertainty in a rendered image 100i from a visualization system 10 can come from sources other than alternative visualization parameters 101, including, for example, compression 102, post-processing 103, reconstruction 104, and data capture 105. The data capture 105 is a measurement that typically includes noise. The process of reconstructing 104 the data capture measured values (e.g., reformatting into a Cartesian grid) can introduce some distortion. Post-processing 103 such as edge enhancement or noise reduction introduces another deviation from the original data. A lossy compression algorithm or other compression technique 102 may also cause distortion in some form. It may be "ideal" to consider all the sources of uncertainty when exploring alternative appearances (visualizations) of the image. In practice, however, it is likely that uncertainty information is known for only some of the components, e.g., the latter three components in the pipeline: post-processing 103, compression 102, and visualization 101.

Figure 8:
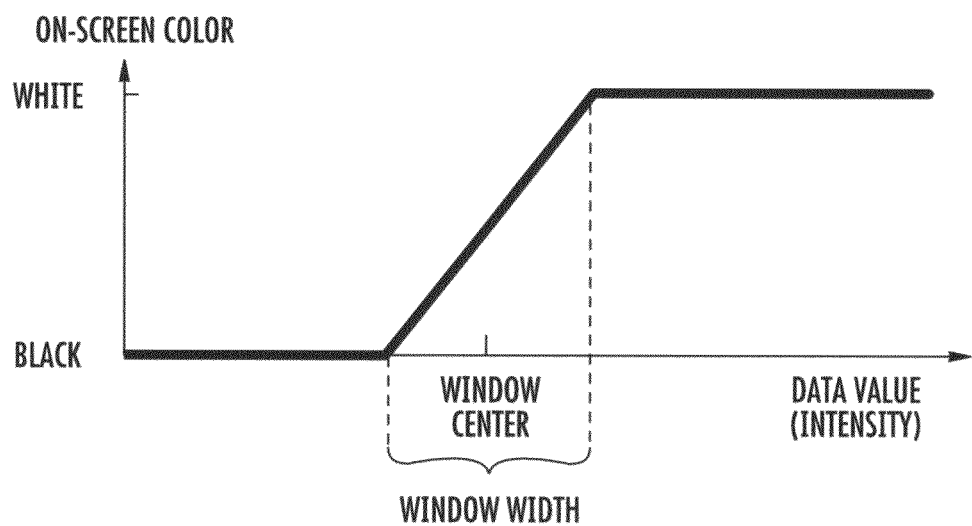
FIG. 8 is a graph of a window of on-screen color (black to white) versus intensity.

In some embodiments, visualization uncertainty can be associated with greyscale windowing. For example, as shown in FIG. 8, the numerical values of the data can be mapped to a greyscale value on screen. The greyscale window can be the main tool for controlling the appearance when displaying 2D (greyscale) images. In one form of a user-controlled tool, the window is defined by its width and center, corresponding to contrast and brightness, respectively. The user can interact with the greyscale window during a diagnostic review, to see if alternative appearances can lead to other conclusions. The various possible greyscale window settings can constitute an uncertainty in the visualization of the displayed image.

Figure 9A:
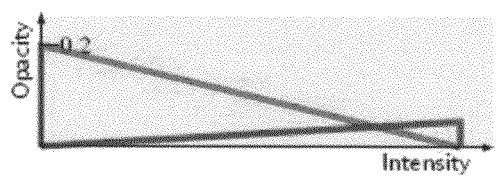
FIGS. 9A and 9B are graphs of transfer function models with material specific components.
Figure 9B:
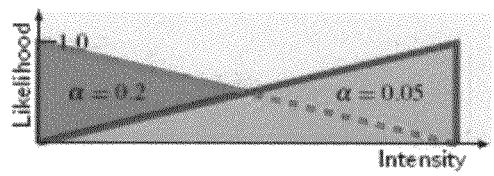

In other embodiments, visualization uncertainty can be found in 3D images created by Direct Volume Rendering (DVR) (typically provided as an unclassified data set). In this case, a Transfer Function (TF) maps numerical values to optical properties: color and opacity. As discussed above with respect to the greyscale windowing, adjustments to the TF are relatively common and can constitute an image uncertainty. Indeed, some radiologists have used the TF as an interactive tool for fuzzy classification of tissues. FIGS. 9A and 9B are graphs of transfer function models with material-specific components. FIG. 9A is a graph of opacity versus intensity of a conventional model where each material corresponds to a varying opacity across the data value range (intensity). FIG. 9B is a graph of a likelihood (probability) versus intensity of a probabilistic model, where each material corresponds to a varying material likelihood across the data value range (intensity) and both a static color and a static opacity according to embodiments of the present invention. Thus, the TF can also be interpreted as being explicitly probabilistic as shown in FIG. 9B. In this case, the numerical values are mapped to a set of material probabilities. These probabilities are a direct representation of the possible appearances, i.e., the image uncertainty. In some embodiments, where used, the TF can perform a classifying role that can be separated from its appearance-mapping role. Each frame of an animated sequence of images can be a DVR image showing visualization differences that a user can readily comprehend and appreciate and is a relatively fast method of viewing alternative renderings without decreasing spatial precision in the image.

Generally stated, the two primary functions or roles of TFs can be distinguished. The TF is seen as a classification tool in both roles, but there is a difference as to whether material probabilities are an implicit or explicit part of the mapping. In the explicit case, the application of a TF is typically modeled as a two-step approach. First, the sample value s is mapped to a set of material probabilities $p_m(s)$, where m is the index among the M materials. Then the material probabilities are used to combine the individual material colors $c_m = (r_m, g_m, b_m, \alpha_m)^T$, which results in the sample color $c(s)$. Such an approach was employed in the initial DVR implementation by Drebin et al., according to equations 1 and 2. See, e.g., Drebin et al., *Volume rendering*, In Proceedings of Computer Graphics and Interactive Techniques, volume 22, pages 65-74, ACM SIGGRAPH, 1988. Transparent regions are referred to as the null material (m=0).

$$c(s) = \sum_{m=0}^{M} p_m(s) \cdot \tilde{c}_m \quad (1)$$

$$\tilde{c}_m = (\alpha_m r_m, \alpha_m g_m, \alpha_m b_m, \alpha_m)^T \quad (2)$$

In the implicitly probabilistic view, the TF is seen as a direct mapping from sample value s to sample color c(s). This is the currently dominating approach and it is the view represented in recent DVR literature. See, C. D. Hansen and C. R. Johnson, editors. The Visualization Handbook. Elsevier Butterworth-Heinemann, 2005; and K. Engel, M. Hadwiger, J. Kniss, C. Rezk-Salama, and D, Weiskopf. Real-Time Volume Graphics. A. K. Peters, Ltd, 2006. Fuzzy classification is typically achieved by connecting material probability to the opacity level, giving low opacity to uncertain materials. In the terms of Equation 1, the product $p_m(s) \alpha_m$ is integrated into $\alpha'_m(s)$.

One objective of the uncertainty visualization contemplated by embodiments of the instant invention is to explore relevant alternative renderings, given a TF. The implicit representation may not be suitable for this task. A crude form of sensitivity analysis can be made by perturbing the TF parameters, but control of the exploration may not be sufficient. In contrast, an explicit probability model can provide a well-defined uncertainty domain.

Thus, in some embodiments, the TF model used to assess uncertainty can be explicitly probabilistic. Each material to be visualized is connected to an individual TF component having two parts, as shown in FIG. 10A. The first is the material appearance (rgbα), which can be chosen to be static in order to promote simplicity in the interpretation of the rendered image. The second part is the classifying function $\tilde{p}_m(s)$ that maps intensity to material likelihood. In the explicitly probabilistic TF model, the familiar TF GUI components define the material likelihood. FIG. 10A illustrates an exemplary explicitly probabilistic TF model, with the TF GUI components defining the material likelihood and different colors versus intensity ($c_1$, $c_2$ and $c_3$ all being different colors). In this embodiment, the material appearance is separated from the classification process. FIG. 10B illustrates the explicitly probabilistic TF model used to generate the animation frames shown in FIGS. 4A-4C. The material appearance is separated from the classification process. The intensity-specific material probabilities can be the normalized likelihoods as expressed in Equation (3).

$$p_m(s) = \frac{\tilde{p}_m(s)}{\sum_{m'=0}^{M} \tilde{p}_{m'}(s)} \quad (3)$$

The user can define $\tilde{p}_m(s)$ in a TF GUI, a convenient form is trapezoids in the [0.0,1.0] likelihood range. Null material likelihood can be implicitly defined based on Equation 4.

$$\tilde{p}_0(s) = \max\left(0.0, 1.0 - \sum_{m=1}^{M} \tilde{p}_m(s)\right) \quad (4)$$

A standard TF having material-specific components can be transformed into a probabilistic formulation. The proposed mapping may not give useful results in all cases, but it is feasible for certain TF types. The material appearance $c_m$ is set to $(r_m, g_m, \hat{\alpha}_m)^T$, where $\hat{\alpha}_m$ is the maximum opacity of the material. The material likelihood can be a simple scaling of the opacity profile per Equation (5).

$$\tilde{p}_m(s) = \alpha'_m(s)/\hat{\alpha}_m \quad (5)$$

The benefits of explicitly probabilistic TF models can be used for uncertainty animation as will be described further below and in other applications. Having a separate probability component can allow many possibilities for visualization of statistical properties and may also be used for non-animated renderings. An example of the use of the explicitly probabilistic TF model is to connect uncertainty to color desaturation, which has previously been proposed in other domains. See, e.g., T. Hengl, *Visualization of uncertainty using the HSI colour model: computations with colours*, In Proceedings of the 7th International Conference on GeoComputation, pages 8-17, 2003. According to some embodiments of the present invention, with explicit probabilities, it is relatively straightforward to achieve this effect as shown, for example, in FIGS. 11A and 11B.

FIGS. 11A and 11B illustrate modeling probability by desaturation for an MR renal angiography. FIG. 11A is a traditional rendering, where it can be hard to visually distinguish between thin tissue regions and regions with low tissue classification probability. FIG. 11B is an image desaturating uncertain regions using a probabilistic DVR approach. The TF has a single component describing the likelihood of vessel tissue.

It is contemplated that using the TF model of a material-likelihood GUI can promote the physicians' understanding of the TF adjustment process as an exploration in form of classification interaction rather than an appearance modification.

With respect to uncertainty due to compression, lossy compression algorithms will discard information from the data set. Nevertheless, lossy compression is feasible and necessary in many situations with limited system resources such as network bandwidth or storage capacity. Images displayed from a lossy compressed data set therefore constitute a "best guess", with inherent uncertainty arising from the unknown discarded data. If the compression-related uncertainty can be modeled for the different regions of the data set, it can be employed in a sensitivity lens application. A possible solution for modeling compression uncertainty is to retrieve distortion information at compression time and simplify this information into compact meta-data that can be used to approximate uncertainty in a sensitivity lens application. Such a simplification may be achieved by deriving average distortion for a number of intervals in the spatial frequency domain or deriving variance for different spatial regions.

Post-processing algorithms, such as edge enhancement filters, high or low pass filters, anisotropic diffusion and/or sub-sampling filters, combinations of filters or other filters, can alter the data. Typically, there are many possible parameter values for the algorithms that result in slightly different output images, which can potentially lead to different diagnostic conclusions. Normally, a single choice of parameter is made (and may be pre-defined by a technician that is not the radiologist) resulting in a single image instance. The sensitivity lens can be used to show the image uncertainty arising from multiple post-processing algorithm parameter settings. The sensitivity lens can also be used to alternate between applying no post-processing and several different post-processing algorithms.

Whether for visualization or other processing parameters that can result in image uncertainty, the sensitivity lens 100 can be used to generate animation of a region of interest to show alternative appearances. In some embodiments, the different uncertainty types can be connected to different animation techniques. Many uncertainty types can arise from different parameter settings. For the user-controlled parameter setting in the greyscale window and TF cases, a useful animation is to perform automatic perturbations (variations) of one or more selected parameters. For example, a base setting is used, then the sensitivity lens 100 is applied and shows the different appearances due to perturbations of the base setting parameter(s). The base setting(s) can be predefined or set manually.

With respect to post-processing operations, post-processing algorithms are typically performed in isolation from the visualization scheme. Therefore, the animation does not control the post-processing parameters and the above perturbation techniques is not suitable. In this case, the animation can, instead, rely on meta data describing the alternative versions of the data. The straight-forward possibility is to have the full alternative versions, making the animation a sequence stepping through the alternatives. As this solution may be unduly memory consuming, more efficient representations of the meta data could be used, for instance a low-resolution variance measure for the data set. The sensitivity lens can generate a sequence of images (frames) with an animation scheme employing a variance-controlled distortion when sampling the data set, regions with low variance (low uncertainty) will yield similar values across the animation frames, whereas high variance (high uncertainty) regions will change over time. Thus, rendering can be animated by sampling the probability domain over time, which results in display of a varying appearance for uncertain regions.

A specific case of uncertainty arising in a visualization stage is when employing DVR with a probabilistically interpreted TF. Even though few TFs are described as explicitly probabilistic, many models can be connected to such an interpretation. The animation approach can be used to represent material probability in the time dimension as will be discussed further below. In some embodiments, the animation can provide the arrangement of material mappings across time, resulting in a plurality (e.g., three) of different animation modes.

In some embodiments, animation techniques for exploring the domain of possible outcomes can use a probabilistic classification. Generally stated, the approach translates to a sequence of Monte Carlo simulations of the rendering. The classifier in focus can be the probabilistic TF model discussed above that can provide a set of material probability values $\{p_m(s)\}$, m=0,1, . . . , M, for each intensity value "s". The animation techniques can, however, be employed in combination with arbitrary probabilistic classification method.

The animated rendering can be the derivation of the sample color c(s) from the material probabilities. In a traditional rendering, the process would be to mix the materials' colors, weighted by the probabilities as described by Equation 1. Introducing animation, the possibility to represent probability in the time dimension is added. A straight-forward linear mapping is employed. Having $p_m(s)$=x % translates to setting $c(s)=c_m$ in x % of the frames in the animation. Doing this for all materials, the sequence of sample colors captures the probabilistic properties of the sample. Applying this for all samples in the volume will, consequently, capture the probabilistic properties of the entire data set, see FIGS. 14*a-k*. Intensity values corresponding to uncertain material classification will have varying color mapping in the rendering. Note that to achieve a relevant probabilistic representation in the animation, the material colors cannot be mixed in the sampling stage. Color mixtures in the rendering only arise from depth-wise compositing. Those of skill in the art will recognize that time-probability representation is not the only possibility for rendering.

Θ denotes the total number of steps in the animation cycle. Thus, the probabilistic animation scheme can map each intensity value to an array of Θ material colors, in contrast to the single rgbα value in the traditional case. This is illustrated in FIG. 12. Expanding this to the whole intensity range, the normal 1D look-up of material color mixtures is replaced by a 2D look-up of pure material colors. The added dimension is named the animation index, θ. The animation is achieved by cyclically changing the θ value for each rendered frame. The resolution in the probability domain is controlled by increasing the Θ value. The renderings of medical data sets in some examples in this application have Θ=16.

FIG. 12 schematically shows a traditional DVR vs. probabilistic animation. Traditionally, the TF maps an intensity value to a single color, a mixture of material colors as noted by a). The probabilistic animation maps an intensity value to an array of pure material colors with an animation index θ as noted by b).

The animation has been implemented as part of a GPU-based texture-slicing volume renderer. Typically, the only modification of the standard implementation is to replace the color-opacity look-up table (LUT) by a material selection LUT and a material color array, see FIG. 13.

The material selection LUT is a 2D table, where each row spans the intensity range and the columns correspond to the Θ steps in the animation cycle. The table is filled with material indices. Thus, each row represents a specific intensity material mapping for an animation frame. The found material index points to the appropriate position of the material color array, which yields the fragment color.

FIG. 13 illustrates a fragment shader implementation of probabilistic uncertainty animation. From left to right, the sample intensity value s is a column index into the material selection LUT. Together with the animation index θ, a material index is looked up and finally used to find the resulting sample color.

Figure 14:
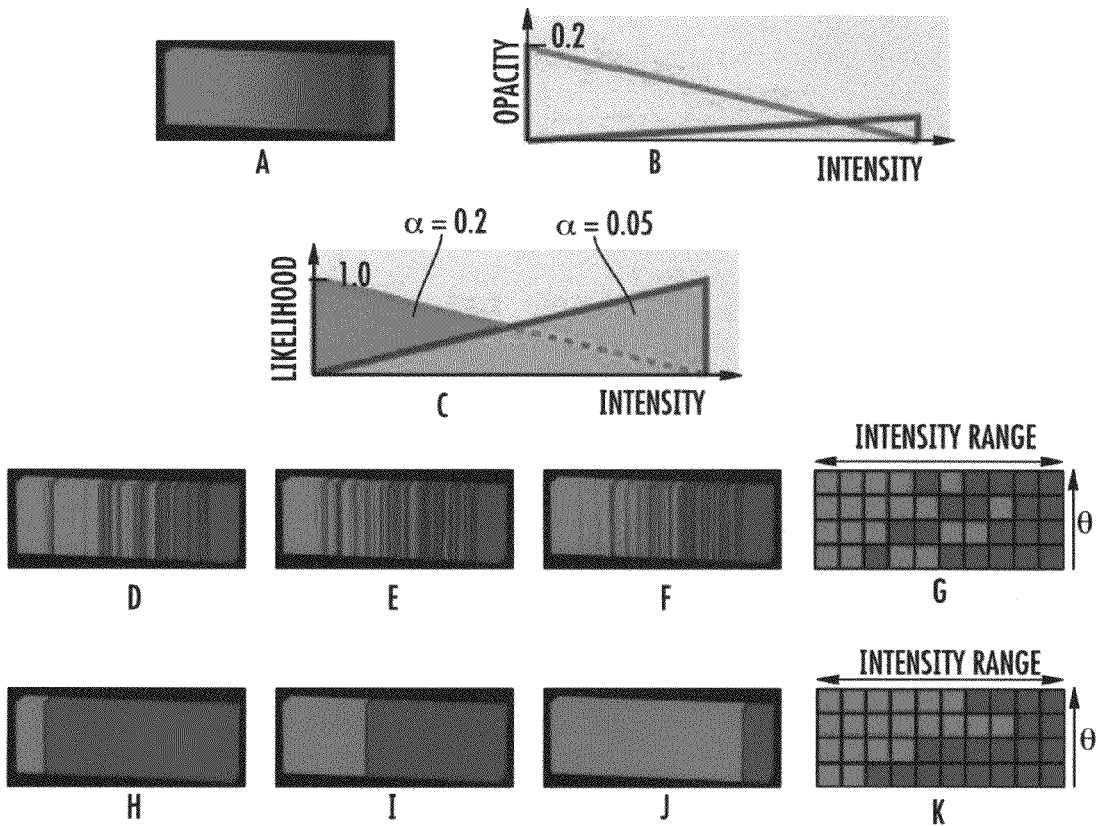
FIGS. 14a-14k are examples of probabilistic animation according to embodiments of the present invention.

FIGS. 14*a-k* illustrate examples of traditional and probabilistic animation. Although shown in black and white, the images are typically in color and as shown were rendered in red (the lighter gray portion) and blue (the darker/black portion). The data set has a linear gradient in the horizontal direction. FIG. 14*a* is a traditional rendering. FIG. 14*b* is a corresponding traditional TF used for the rendering in FIG.

14a. FIG. 14c is the explicitly probabilistic TF used for the animations. FIGS. 14d-f are frames from probabilistic animation (Θ=4) in random mode, for θ=0, 1, and 2. FIG. 14g is a schematic view of intensity ⇆ color mapping in random mode. FIGS. 14h-j are frames from probabilistic animation (Θ=4) in material sync mode, for θ=0, 1, and 2. FIG. 14k is a schematic view of intensity ⇆ color mapping in material sync mode.

The material selection LUT can be derived in software as soon as the TF is changed. For each frame to render, the animation index θ is updated, which is used to sample the correct row of the material selection LUT. The discussed methods affect all samples of a certain intensity equally. However, an alternative would be to perform an individual material color lookup for each sample, i.e., changing θ between samples. This, however, may have certain disadvantages in terms of computational complexity and reduced difference between animation frames.

The above-discussion focuses on the simple classification of a 1D intensity TF. The general case is that an arbitrary classification scheme has produced a volume with material probabilities. The probabilistic animation is expected to generalize well as will be discussed further below.

Figure 15:
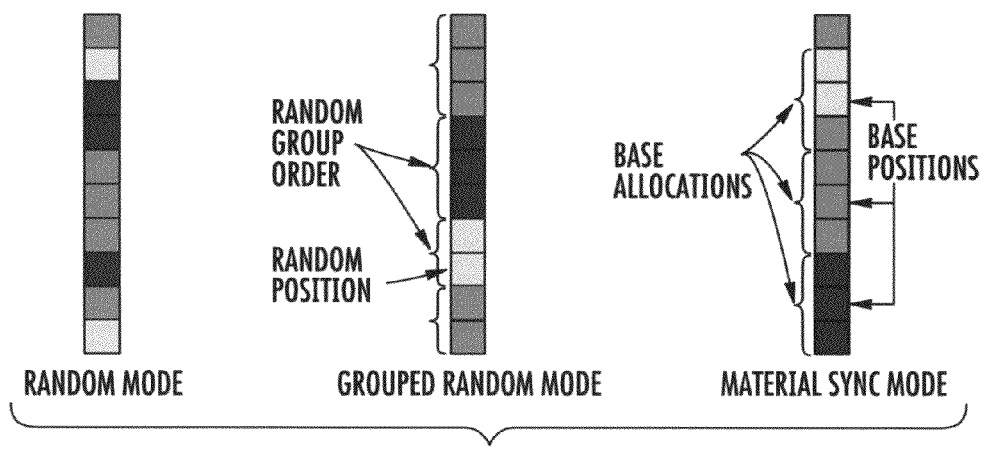
FIG. 15 is a schematic illustration of three different probabilistic animation modes, random mode, grouped random mode and material sync mode according to embodiments of the present invention.

In some embodiments, different animation modes may be used, depending, for example, on the degree of variation or the type of uncertainty being explored. As described above, the material probabilities connected to a certain intensity value can be represented by the relative number of entries of each material in the corresponding column of the material selection LUT. The term "animation array" will be used for such a column. The probabilistic relevance is retained as long as the number of entries for each material is not changed, but the order of the entries can be changed without loosing the probability mapping. Different uncertainty visualization effects can be achieved by arrangement within the array. For example, a plurality of different animation modes can be used. FIG. 15 illustrates three probabilistic animation modes.

Random mode. The population of the array is fully randomized.

Grouped random mode. The entries are grouped for each material, but the order and position of the groups are randomized.

Material sync mode. Each material has a fixed base position in the array, around which the material entries are centered.

FIG. 15 shows that the respective modes are defined by the arrangement of material entries across the animation index dimension, illustrated for a single intensity value. Note that the number of entries for each material is the same across all modes. (Black=null material) The left side of the figure illustrates the Random mode. The materials are randomly inserted according to the probabilities. The middle grid represents the Grouped random mode. The entries are grouped according to the material and the groups randomly placed. The right grid illustrates the Material sync mode. The materials are centered at a respective base position.

One motivation for the grouped random mode is that it has a smoother appearance relative to the random mode, which mitigates the visual fatigue of looking at a flickering image. The benefit of the material sync mode is that there will be an animation frame that shows the maximum extent of each material, at the animation index corresponding to the material's base position. This synchronization uses a sorting procedure for each value in the sample range and can be performed as follows. The algorithm can produce an array containing Θ material selections for each intensity value. A common base allocation span d and material base positions $\mu_m$ are set:

$$d = \lfloor \Theta/(M+1) \rfloor, u_m = m \cdot d + \left\lfloor \frac{d}{2} \right\rfloor, \quad (6)$$

A selected material is then entered into the array at the position closest to the base position. The base allocation span is reserved for the corresponding material for its first d selections, if there are so many. When all possible base allocations are done, the remaining empty slots are filled with materials having a number of entries exceeding the base allocation.

Variations of the animation techniques can be put to use in different scenarios. An immediate, qualitative impression of the uncertainty is achieved by the random or grouped random modes at a fairly high animation speed (e.g., 10 fps or "frames per second"). For more detailed analysis of possible extents of a tissue, the material sync mode at a moderate animation speed (e.g., 5 fps) is appropriate. Another possibility is to use the material sync mode for TF tuning. Using a low animation speed (e.g., 2 fps), the user can fix the TF at the animation step that best represents the features of interest.

In some embodiments, the instant invention can be used in workflow settings. That is, in some embodiments, the sensitivity lens 100 can be used when the radiologist gets a predefined setting of some sort and wants to check that the appearance in diagnostically important regions of the image is robust across alternative settings, without resorting to time-consuming and uncontrolled manual adjustment.

In the clinical case, the sensitivity lens 100 can be configured to meet extreme demands on simplicity and efficiency since the physicians typically have very limited time for each diagnosis. In some embodiments, uncertainty animation can be used on a small region of interest rather than an entire volume. The typical case is that a sensitivity analysis is wanted for a few clinically important regions. The lens 100 can be a small user-controlled region-of-interest in which the selected animation technique is applied while the rest of the image can be rendered traditionally. This tool is expected to be easy to master, since it can be used without parameter tuning and since it resembles a familiar magnifying glass tool. Another advantage is that potential visual fatigue from studying the animations is reduced thanks to the small region.

The sensitivity lens 100 has potential to become an important tool in the clinical workflow for 3D visualization with DVR. As a consequence of the high radiologist workload, there are many radiologists that do not have the time to become 3D experts. In those cases, a common solution is that a technician works as the 3D expert and produces the base settings for the 3D visualization, including the TF parameters. The radiologist then makes the diagnostic assessment from this predefined visualization. Unfortunately, this workflow model may introduce risk since the limited medical knowledge of the technician may lead to inadequate visualizations without the radiologist noticing it. The sensitivity lens 100 provides an efficient tool to evaluate the robustness of the technician's settings while not requiring the radiologist to know the intricate details of DVR. The sensitivity lens 100 can then act as a quality assurance tool, allowing the radiologist to explore alternative renderings substantially automatically.

As noted above, the probabilistic animation scheme has been primarily described using a classification in form of a 1D intensity-based TF. The relevant starting point for an arbitrary classification scheme is a volume with material probabilities. However, embodiments of the invention have broader application. For example, as shown in FIG. 16, the probabilistic animation can be used for the general case.

FIG. 16 illustrates a volume classified with respect to M materials, exemplified for M=3. From left to right: The material probability vector $p=(p_1, \ldots, p_M)$ is looked up in the material probability LUT, restricted by $\Sigma^M_{m=1} p_m \leq 1.0$. The found value is a column index into the $\Theta \times N$ material selection LUT. Together with the animation index $\theta$, a material index can be looked up and used to find the resulting sample color.

A sample from the classified volume corresponds to a location in an M-dimensional material probability LUT. The material probability LUT points into a material selection LUT and the sample color is then found in the material color array.

The sizes of the LUTs are not expected to be a problem. Judging from the experience with the TF-based scheme, a size of $10^M$ would be sufficient for the material probability LUT and can probably be reduced further for large M. Moreover, the restriction that the sum of probabilities is less than 1.0 allows for reduced storage. The number of columns in the material selection LUT, N, equals the number of unique ways to fill $\Theta$ slots from a set of M+1 material indices. This is known as the multichoose operation and can be mathematically described as follows below.

$$N(M, \Theta) = \binom{(M+1)+\Theta-1}{\Theta} = \frac{(M+\Theta)!}{M!\Theta!} \quad (7)$$

$N(4, 10) = 286$ $N(8, 10) = 43758$ $N(4, 20) = 63756$

Thus, the LUT size is not a problem for reasonable values of M and $\Theta$.

The present invention is explained further in the following non-limiting Examples Section.

Examples

The tests of the proposed animation techniques evaluated aspects of the clinical usefulness. The results are presented below in two parts. First, results from an experimental study on stenosis assessment for simulated vessels are shown. The second part includes renderings of data sets from diagnostic situations where the classification task of DVR is thought to be particularly challenging and sensitive to errors. Note that the still image presentation in this paper makes the frame-to-frame differences appear overly subtle. Refer to the video file available at http://www.cmiv.liu.se/Members/clalu/uncert-.mpg for a more realistic impression of the animation.

Simulated Clinical Task

A test of the benefits of uncertainty animation is to find out whether it can increase the diagnostic accuracy in the challenging case of MR angiographies. Therefore, an experimental study on simulated vessels was carried out, see FIGS. 17A-17D. The test subjects were twelve physicians, eleven radiologists and one cardiologist, all with clinical experience of stenosis assessment.

FIGS. 17A-17D illustrate a simulated stenosis assessment. The outer perimeter of the vessel model has constant radius, whereas there is a concentric plaque that creates a simulated stenosis. The plaque profile is a cosine curve. The task is to assess the stenosis degree, d1/d2 as shown in the schematic of FIG. 17D. As also shown in FIG. 17D, the vessel model has three materials, the vessel lumen, the vessel wall/plaque, and the background with overlapping intensity distributions in order to make the task challenging. FIG. 17A is an example of a rendered image frame in material sync mode. FIGS. 17B and 17C are cut-outs (corresponding to the red frame of full image 17A) of the vessel at two other time steps. FIG. 17D is a schematic of the vessel model.

The test was designed to resemble a low-quality data set in combination with an untuned and fixed TF, when zooming in on a suspected stenosis. Three rendering methods were tested for 24 vessels: traditional static rendering and uncertainty animation in grouped random and material sync modes. The animations were fixed at 6.0 fps. The accuracy of each method was measured as the absolute error in assessing the stenoses on a four-grade scale. The details of the study setup are given below.

The result of the study is presented in Table 1, method results to the left and pairwise comparisons to the right. The scores are aggregated assessment error, a lower score means a higher accuracy. The score spread is presented as interquartile range (IQR). The statistical significance level was set at $p<0.05$ and the statistical analysis was performed in StatView 5.0 (SAS Institute, Cary N.C., USA).

TABLE 1

Error Scores and Comparisons for Stenosis Assessment

| Method | Median | IQR |
| --- | --- | --- |
| Material Sync | 7.5 | 1.0 |
| Grouped Random | 13 | 3.5 |
| Traditional | 14 | 7.5 |

| Comp. | p |
| --- | --- |
| Material Sync < Traditional | 0.0057 |
| Material Sync < Grouped Random | 0.013 |
| Grouped Random < Traditional | 0.35 |

The result shows that the material sync mode provides the highest accuracy in this task. The aggregated error for each subject/method combination was analyzed using Friedman's test, which showed that there is significant differences between the methods (p=0.0069). Subsequent pairwise Wilcoxon tests showed that the material sync mode has significantly lower error (higher accuracy), than the other two methods. The grouped random animation has slightly lower median than the traditional rendering, but the difference is not significant.

In order to establish a "gold standard" benchmark, the subjects also assessed the 24 vessels in a traditional rendering with free manual adjustment of the TF. The median accuracy was found to be 6, which means that the material sync mode, with a median of 7.5, comes quite close to the gold standard even though no TF adjustment was allowed in that case.

A brief interview was carried out with the physicians after the test. Out of the tested methods, ten out of the twelve preferred the material sync mode in the test setup. Two reasons repeatedly came up as motivation: that the vessel structure was clearly seen and that the synchronization resembled the familiar manual back-and-forth TF adjustment. Two physicians preferred the grouped random mode, but their accuracy was actually lowest for that method. Furthermore, there was consensus that uncertainty animation would improve accuracy and/or efficiency for difficult stenosis assessments. Finally, nearly all physicians stressed that in real clinical usage it is highly desirable that the physician be able to interactively control the uncertainty animation in terms of the speed and the underlying probabilistic TF.

Details of Experimental Study

The vessel model, shown in FIGS. 17B-17D, was validated as realistic by three radiologists before the start of the study. In order to make the assessment challenging, the three materials (vessel lumen, vessel wall/plaque and background) were given highly overlapping intensity distributions. A realistic appearance of the vessel lumen was achieved by making the intensity decrease for increasing radius, causing the transition to the lower intensities of the wall and plaque to become very subtle. Twenty four (24) different vessels were tested with randomized variations in stenosis degree, but also other parameters (radius and horizontal position of vessel, vertically varying horizontal offset of vessel, and vertical position of stenosis) were given varying values to make each test independent. Each vessel was given a randomized TF, consisting of a single trapezoid, designed to be more or less suboptimal. The transformation of Equation 5 was used to create comparable TFs for the methods. The TFs and the viewpoint were not adjustable.

Each physician assessed the stenosis of the vessels on a four-degree scale: 0-25%, 25-50%, 50-75%, and 75-100%. For the case that the stenosis was not assessable at all, the radiologist had a fifth possible outcome, "Unknown". The scale was indexed 0,1,2,3 and the absolute index difference to the target index was used to measure accuracy. The "Unknown" response was given a fix error of 3.

In total, each test consisted of 72 trials, i.e., all method/vessel combinations. The order of the trials was determined by a controlled randomization. To avoid carry-over effects, the order in which the methods occurred was counterbalanced both within each subject's trial set and between the subjects. Moreover, the controlled randomization ensured that two trials for a certain vessel was separated by at least 20 other trials. To familiarize the subjects with the task before the test, the setup was demonstrated by 12 dry-run trials (all method/stenosis degree combinations) where the TF could be adjusted and the accuracy of the assessment was fed back to the subject. The "gold standard" test with free manual TF adjustments was carried out for the 24 vessels after the main test.

Renderings of Clinical Data Sets

MR angiographies are a clinical examination with great need for uncertainty visualization. MR examinations are preferred over CT scans since ionizing radiation is potentially damaging and is to be avoided if possible. DVR of MR angiographies is, however, time-consuming and error-prone. Static TFs are not used as the intensity scale varies between patients and an inadequate visualization can give an incorrect impression of the vessels that affects the medical assessment. See, e.g., Persson et al., *Volume rendering compared with maximum intensity projection for magnetic resonance angiography measurements of the abdominal aorta*. Acta Radiologica, 45:453-459, 2004. The animated renderings have been applied to several MR angiographies, two examples are described below.

Figure 18A:
FIGS. 18A-18C are frames of uncertainty animation in material sync mode for a MR renal angiography according to embodiments of the present invention.
Figure 18B:
Figure 18C:
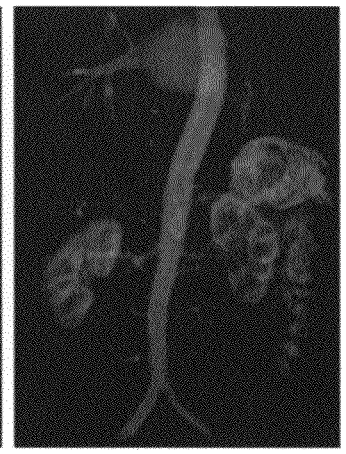
Figure 18D:
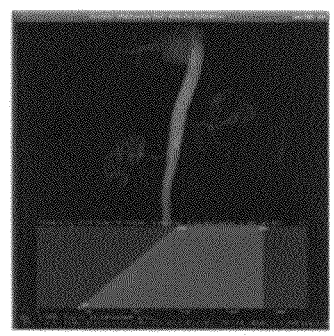
FIG. 18D is a screen shot from an application with a GUI to select a region of interest for uncertainty assessment to run the uncertainty animation as shown in FIGS. 18A-18C according to embodiments of the present invention.
Figure 18E:
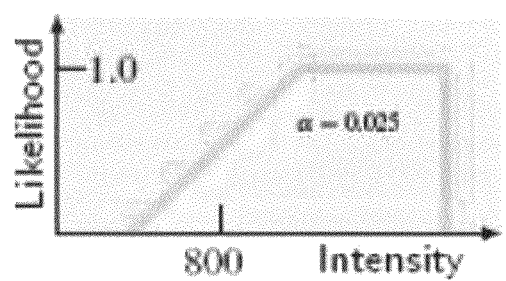
FIG. 18E is a probabilistic transfer function (likelihood versus intensity) used to generate the animation frames shown in FIGS. 18A-18C according to embodiments of the present invention.

FIGS. 18A-18C show the uncertainty animation in material sync mode for a MR renal angiography. The diagnostic task is to determine location and significance of any stenoses. The vessels cannot be isolated through any single setting of an intensity-based TF; when the minor vessels appear, so do the kidneys and other parts. With the uncertainty animation, the alternative visualizations can be explored by a single TF setting. FIG. 18D is screen shot from the test application GUI and FIG. 18E is a probabilistic TF.

Despite the calibrated Hounsfield scale, CT data sets often have overlapping tissue intensity ranges, which can cause ambiguous visualizations. Such an example is the thyroid tumor in FIGS. 19A-19F, where the tumor extent in relation to the left carotid arteries is crucial to the pre-operative planning. The highly different frames show that there may be a large span of alternative visualizations even though the traditional, static rendering seems distinct.

Figure 19A:
FIGS. 19A-19F illustrate a CT (Computed Tomography) examination of a thyroid tumor.
Figure 19B:
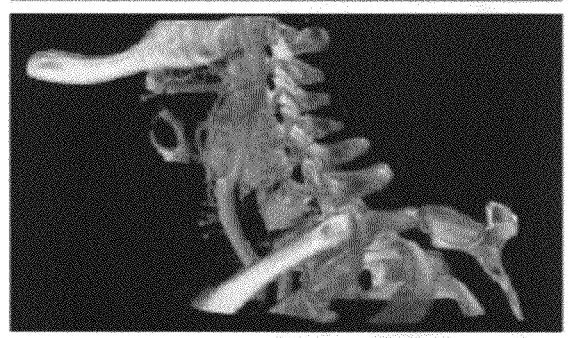
Figure 19C:
Figure 19D:
Figure 19E:
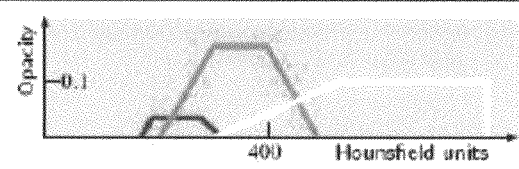
Figure 19F:
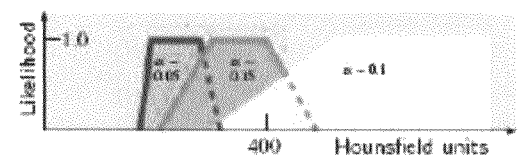

FIGS. 19A-19D are images of a CT examination of a thyroid tumor. The top image (FIG. 19A) is a traditional diagnostic visualization with overlapping TF components for tumor (green), vessels (orange), and bone (white). The following three images (FIGS. 19B-D) are different frames from an uncertainty animation in material sync mode. The dramatic differences between the frames show that there is much inherent uncertainty in the traditional rendering (FIG. 19A) to be explored. The traditional TF is shown in FIG. 19E and the probabilistic TF is shown at FIG. 19F.

Figure 20A:
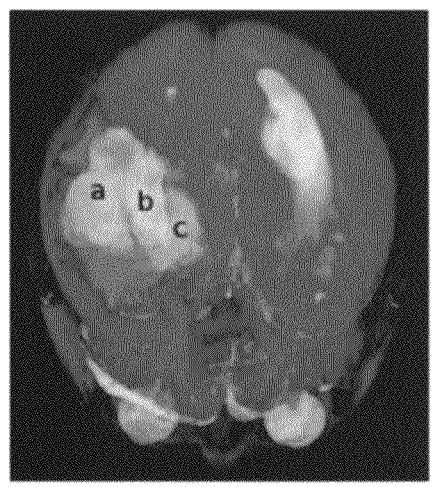
FIGS. 20A-20D illustrate an MR brain examination.
Figure 20B:
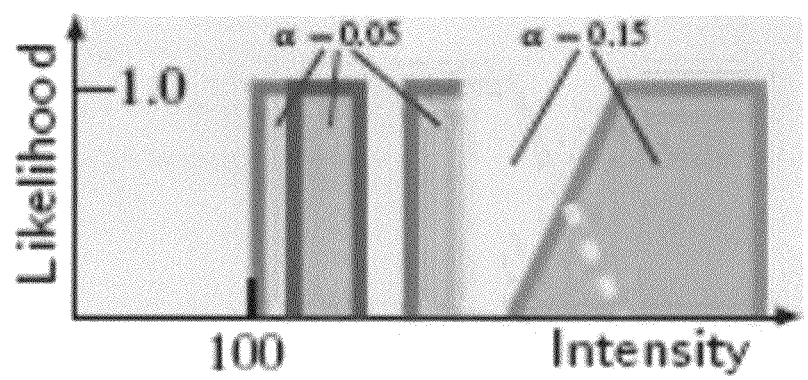
Figures 20C, 20D:
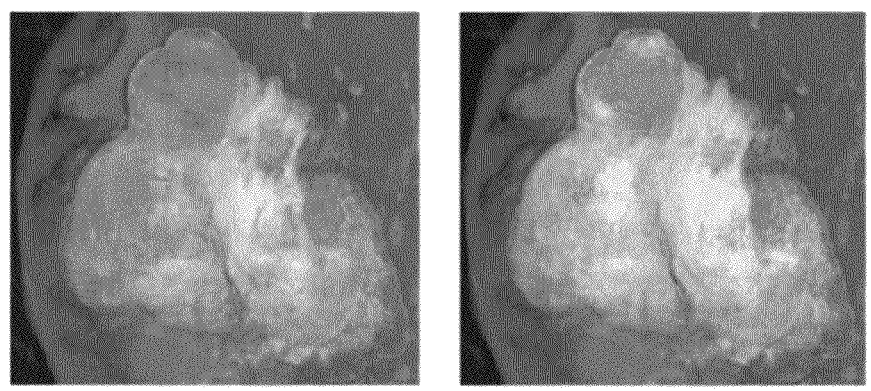

Another example is an MR brain examination showing a large cyst, as shown in FIGS. 20A-20D. FIG. 20A illustrates a tissue complex in the right brain hemisphere having a cyst (a), a hemorrhage (b), and a ventricle (c), all three in the yellow-orange span. The complex is surrounded by an edema (green). The diagnostic task is to determine the borders between the cyst and the hemorrhage. FIG. 20A is a traditional rendering. FIG. 20B is a probabilistic TF. FIGS. 20C and 20D are two different zoom-ins of uncertainty animation frames in random mode.

The important clinical question is if the cyst is distinctly separated from the hemorrhage, the two regions having very similar intensities. The uncertainty animation provides a controlled exploration of the extent of the tissues.

On the tested system, the rendering performance was about 10% lower for the animation methods compared to the standard method, see Table 2. The derivation of the material selection LUT was carried out in about 1-3 ms. The test system was a PC with an AMD Athlon 64 CPU and an nVidia 8800 GTX graphics board with 768 MB, the volumes were rendered in a 512×512 view port.

TABLE 2

FPS Performance of Uncertainty Animation

| | Data set | | |
|---|---|---|---|
| Size | MR renal 512 × 512 × 56 | CT neck 512 × 512 × 512 | MR brain 432 × 432 × 160 |
| Traditional | 42.7 | 9.2 | 31.0 |
| Animation | 38.4 | 8.2 | 28.4 |

The experimental study shows that for a fixed TF setting, the uncertainty animation in material sync mode is clearly more efficient for stenosis assessment than a static rendering. In fact, it comes quite close to the "gold standard" of free manual adjustment, a clear indication that time-consuming TF interaction can to some extent be replaced by uncertainty animation. Even though the intentionally poor conditions of the simulation would not be acceptable in a clinical situation, the physicians considered the test to have bearing on real diagnostic work.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this That which is claimed:

1. A method of assessing uncertainty of features in images rendered in a medical visualization system, comprising:
accepting user input on a display to selectively apply at least one sensitivity lens to a region of interest (ROI) of a portion of a visualization of a rendered image shown on the display; and
electronically displaying different visualizations of only the portion of the image associated with the sensitivity lens to assess uncertainty of at least one feature in the image, wherein the displaying step is carried out by displaying the different visualizations of only the portion of the image associated with the sensitivity in at least one animation mode that generates a sequence or series of alternate visualizations based on known potential sources of uncertainty in a medical imaging pipeline.

2. A method according to claim 1, wherein the displaying step is carried out by displaying the different visualizations in at least one of material sync animation, random mode animation and grouped random mode animation, wherein respective animation modes are generated using a respective animation array, wherein the material sync animation mode is carried out such that each material has a fixed base position in the animation array, wherein the random animation mode is carried out such that population of the animation array is fully randomized, and wherein the grouped random animation mode is carried out so that entries in the animation array are grouped for each material but order and position of the groups are randomized, and
wherein the accepting user input is carried out by a user electronically placing the sensitivity lens as a transparent window directly over the ROI.

3. A method according to claim 1, wherein the at least one animation mode comprises material sync animation.

4. A method according to claim 1, wherein the accepting user input is carried out using a graphic user interface window or frame that defines the sensitivity lens and that is configured to allow a user to selectively apply the sensitivity lens, wherein the sensitivity lens causes the displaying step to be carried out so that a visualization system electronically renders the different visualizations.

5. A method according to claim 1, wherein the rendered image is rendered from a multi-dimensional medical image data set.

6. A method according to claim 1, wherein the accepting user input is carried out by providing a graphic user interface with the sensitivity lens as a visually transparent window that can be electronically moved and directly placed by a user over the ROI of the image on the display, and wherein, in response to a user applying the sensitivity lens, the displaying is carried out to display a series of the different visualizations of only the portion of the image underlying the sensitivity lens in an enhanced viewing format to show to a user uncertainty of at least one feature in the portion of the image under the sensitivity lens.

7. A method according to claim 1, wherein the displaying is carried out so that the different visualizations are shown on a display so that only the portion of the image associated with the sensitivity lens is shown in different manners in the at least one animation mode using at least one of the following: (a) different viewing parameters or (b) different processing parameters, to thereby allow a user to consider uncertainty in the portion of the rendered image associated with the sensitivity lens.

8. A method according to claim 1, wherein the sensitivity lens is a graphic user interface window with a user adjustable size, a user adjustable shape, or a user adjustable size and shape that can be electronically placed over a selected region of interest.

9. A method according to claim 1, wherein the displaying comprises electronically enlarging the region of interest underlying the sensitivity lens to enlarge features in the region of interest in the different visualizations while the image outside the sensitivity lens remains substantially unchanged.

10. A method according to claim 1, wherein the displaying in the animation mode comprises generating the sequence or series of the different visualizations of the portion of the image associated with the sensitivity lens using perturbation of viewing parameters.

11. A method according to claim 1, wherein the displaying is carried out to generate a two-dimensional greyscale image of the portion of the image associated with the sensitivity lens.

12. A method according to claim 1, wherein the displaying is carried out using alternate greyscale windowing parameters to generate alternate visualizations of the two-dimensional greyscale image thereby assessing greyscale windowing uncertainty in the rendered images.

13. A method according to claim 1, wherein the rendered image is rendered from a volumetric or time varying volumetric multi-dimensional data set, and wherein the displaying is carried out by rendering the different visualizations using direct volume rendering.

14. A method according to claim 1, wherein the sensitivity lens is configured to cause the displaying step to display the animation mode sequence or series of different visualizations of only the portion of the image associated with the sensitivity lens using different attributes of transfer functions.

15. A method according to claim 1, wherein the displaying is carried out to display the sequence or series of the different visualizations of the portion of the image underlying the sensitivity lens so that tissue associated with at least one feature in the region of interest is visualized with differences in at least one of opacity, color luminance and color saturation.

16. A method according to claim 1, wherein the displaying is configured to display the at least one animation mode sequence or series of different visualizations of the portion of the image so that at least one of the different visualizations is rendered using image data discarded during compression.

17. A method according to claim 1, wherein the sensitivity lens is configured to cause the displaying step in the at least one animation mode to display the sequence or series of different visualizations of the portion of the image so that at least one of the different visualizations is rendered using either: (i) visualization data; (ii) image data; or (iii) visualization and image data not used to render one or more of the other different visualizations.

18. A method according to claim 1, wherein the displaying step is carried out in the at least one animation mode so that at least some of the different visualizations of the images are generated using probabilistic animation based on a probabilistic transfer function model to classify materials in an image data set.

19. A method according to claim 1, wherein the displaying step is carried out to display the different visualizations in the sequence or series using different animation modes associated with respective different types of uncertainty in the medical imaging pipeline.

20. A method of assessing uncertainty of features in images generated using a medical visualization system, comprising:

providing a graphic user input defining a sensitivity lens;
accepting user input to directly place the sensitivity lens as a transparent window over a region of interest of a portion of a visualization of a rendered image on a display; and
electronically displaying different visualizations of only the portion of the image under and/or within the sensitivity lens to assess uncertainty in the visualization of the rendered image, wherein the displaying step is carried out by displaying the different visualizations of only the portion of the image under and/or within the sensitivity lens in at least one animation mode that generates a sequence or series of alternate visualizations based on known potential sources of uncertainty in a medical imaging pipeline.

21. A method according to claim 20, wherein the at least one animation mode comprises one or more of a material sync animation mode, a random animation mode and a grouped random animation mode, wherein respective animation modes are generated using a respective animation array, wherein the material sync animation mode is carried out such that each material has a fixed base position in an animation array, wherein the random animation mode is carried out such that population of the animation array is fully randomized, and wherein the grouped random animation mode is carried out so that entries in the animation array are grouped for each material but order and position of the groups are randomized.

22. A method according to claim 20, wherein the alternate visualizations are based on known potential sources of uncertainty associated with one or more of compression, post-processing, and visualization.

23. A method according to claim 20, wherein the alternate visualizations are based on sources of uncertainty from compression and post-processing.

* * * * *